US011739241B2

(12) United States Patent
Lutz et al.

(10) Patent No.: US 11,739,241 B2
(45) Date of Patent: Aug. 29, 2023

(54) HIGH TEMPERATURE EPOXY ADHESIVE FORMULATIONS

(71) Applicant: DDP SPECIALTY ELECTRONIC MATERIALS US, LLC, Wilmington, DE (US)

(72) Inventors: Andreas Lutz, Freienbach (CH);
Daniel Schneider, Freienbach (CH);
Benjamin Alexander Haag, Horgen (CH); Irene Maeder, Freienbach (CH);
Marcel Aschwanden, Freienbach (CH)

(73) Assignee: DDP SPECIALTY ELECTRONIC MATERIAL US, LLC, Wilmington, DE (US)

( * ) Notice: Subject to any disclaimer, the term of this patent is extended or adjusted under 35 U.S.C. 154(b) by 655 days.

(21) Appl. No.: 16/613,501

(22) PCT Filed: Apr. 10, 2018

(86) PCT No.: PCT/US2018/026784
§ 371 (c)(1),
(2) Date: Nov. 14, 2019

(87) PCT Pub. No.: WO2018/236454
PCT Pub. Date: Dec. 27, 2018

(65) Prior Publication Data
US 2021/0155835 A1    May 27, 2021

Related U.S. Application Data

(60) Provisional application No. 62/523,853, filed on Jun. 23, 2017.

(51) Int. Cl.
| | | |
|---|---|---|
| *C08G 18/12* | (2006.01) | |
| *C08G 18/32* | (2006.01) | |
| *C08G 18/48* | (2006.01) | |
| *C08G 18/69* | (2006.01) | |
| *C08G 18/73* | (2006.01) | |
| *C08G 59/24* | (2006.01) | |
| *C08G 59/40* | (2006.01) | |
| *C08L 9/02* | (2006.01) | |
| *C08L 63/00* | (2006.01) | |
| *C08L 75/08* | (2006.01) | |
| *C08L 79/02* | (2006.01) | |
| *C08G 59/68* | (2006.01) | |
| *C09J 163/00* | (2006.01) | |
| *C08L 75/04* | (2006.01) | |
| *C09J 11/00* | (2006.01) | |
| *C09J 163/04* | (2006.01) | |
| *C08L 63/04* | (2006.01) | |

(52) U.S. Cl.
CPC ............ *C09J 163/04* (2013.01); *C08G 18/12* (2013.01); *C08G 18/3215* (2013.01); *C08G 18/4854* (2013.01); *C08G 18/69* (2013.01); *C08G 18/73* (2013.01); *C08G 59/245* (2013.01); *C08G 59/4021* (2013.01); *C08L 9/02* (2013.01); *C08L 63/04* (2013.01); *C08L 75/08* (2013.01); *C08L 79/02* (2013.01); *C08G 2170/00* (2013.01); *C08L 2205/025* (2013.01); *C08L 2205/035* (2013.01); *C09J 2203/354* (2020.08); *C09J 2301/30* (2020.08)

(58) Field of Classification Search
None
See application file for complete search history.

(56) References Cited

U.S. PATENT DOCUMENTS

| | | |
|---|---|---|
| 3,935,339 A | 1/1976 | Cooke, Jr. |
| 6,359,039 B1 | 3/2002 | Chen et al. |
| 2010/0272908 A1 | 10/2010 | Sturgill et al. |
| 2012/0129980 A1 | 5/2012 | Desai et al. |
| 2014/0150970 A1 | 6/2014 | Desai et al. |
| 2015/0037497 A1 | 2/2015 | Lutz |
| 2017/0022402 A1* | 1/2017 | Lutz ............................ C09J 9/00 |

(Continued)

FOREIGN PATENT DOCUMENTS

| | | |
|---|---|---|
| EP | 0311288 A2 | 9/1988 |
| WO | 2005007766 A1 | 1/2005 |

(Continued)

OTHER PUBLICATIONS

Dow Plastics, "Dow Epoxy Novolac Resins," pp. 1-27, published 1998 (Year: 1998).*
Xiaojun et al., Guangdong Chemical Industry, vol. 33, Series No. 164, No. 12, 2006, New Progress in the Study on Toughening Modification of Epoxy Resin, p. 61-63.
Yamaguchi et al., Kobunshi Ronbunshu (Japanese Journal of Polymer Science and Technology), vol. 73, No. 3, (May 2016), Acetal Linkage-Containing Epoxy Resins that Combine High Adhesiveness with Ready Recyclability: Adhesiveness to Carbon Fibers, p. 244-251.

*Primary Examiner* — Randy P Gulakowski
*Assistant Examiner* — Ha S Nguyen

(57) ABSTRACT

The invention is an epoxy resin system useful as an adhesive for high temperature applications. The system is a combination of a diglycidyl ether a bisphenol epoxy resin(s), at amounts of 30-70% by weight, with 1-10% by weight of an epoxy novolac resin 10-30% by weight of a polyurethane toughener which preferably has the terminal isocyanate functional group blocked, 1-8% by weight of a hardener, 0.1-% by weight of a cure accelerator, preferably a latent urea cure accelerator, provides the desired balance of mechanical strength and elastic modulus. The epoxy novolac resin is characterized by at least one of the following features: (i) having a viscosity at 25 degrees C. of less than 3000 mPa-s according to ASTM D-445, (ii) an average number of epoxide groups per molecule of more than 2 but less than 3.7, and (iii) a molecular weight of less than 750 g/mol.

7 Claims, No Drawings

(56) References Cited

U.S. PATENT DOCUMENTS

| | | | |
|---|---|---|---|
| 2017/0044402 A1 | 3/2017 | Lan et al. | |
| 2018/0258329 A1* | 9/2018 | Koch | C09J 163/00 |
| 2018/0334596 A1* | 11/2018 | Lutz | A61B 5/6877 |

FOREIGN PATENT DOCUMENTS

| | | | |
|---|---|---|---|
| WO | 2009017690 A2 | 2/2009 | |
| WO | 2009/058295 | 5/2009 | |
| WO | 2013/141955 | 9/2013 | |
| WO | 2013142750 A2 | 9/2013 | |
| WO | 2014035655 A2 | 3/2014 | |
| WO | WO-2015160468 A1 * | 10/2015 | B05D 3/0272 |
| WO | 2017/044402 | 3/2017 | |
| WO | 2017044402 A2 | 3/2017 | |
| WO | WO-2017044359 A1 * | 3/2017 | C08G 18/10 |
| WO | WO-2017044401 A1 * | 3/2017 | A61B 5/04001 |
| WO | WO-2017044402 A1 * | 3/2017 | C08G 18/12 |

* cited by examiner

HIGH TEMPERATURE EPOXY ADHESIVE FORMULATIONS

FIELD OF THE INVENTION

This invention relates generally to epoxy formulations useful in bonding various surfaces that are anticipated to go through thermal stresses, including particularly use in bonding parts in transportation vehicles.

INTRODUCTION

In the manufacture of transportation vehicles, including especially cars and trucks, different materials are used in the design to reduce the body weight. Light weight materials like aluminum or carbon fiber reinforced composites are used in addition to steel. In addition, adhesives are more commonly used rather than just welding of parts. Since the vehicle body is heated during manufacture (e.g in the e-coat oven for corrosion protection where temperatures may be in the range of 160 to 210 C) and may also be subjected to large temperature range variations in use, the different thermal expansion rates of the different materials can cause significant mechanical stresses in the joints between the materials Today's structural toughened epoxy based body shop adhesives are not entirely adequate to resist the thermal stresses caused by the different coefficients of linear thermal expansion (CLTE) of the parts made by distinct materials. They are missing higher strength values at higher temperatures and cohesive failure modes at elevated temperatures. Adhesives that have a desired lower elastic modulus do not have the needed high mechanical strength at high temperatures. Attempts to increase the mechanical strength at high temperature often have an undesired effect on the elastic modulus. Thus, a need exists for a structural epoxy adhesive formulation that achieves both a relatively low elastic modulus (e.g. 600-1200 MPa) while retaining mechanical strength at elevated temperatures.

SUMMARY OF INVENTION

The present inventors have discovered a formulation which provides the desired balance of mechanical strength at high temperatures and desired elastic modulus.

Specifically, the inventors have found an epoxy resin system that is the combination of a diglycidyl ether a bisphenol epoxy resin(s), at amounts of 30-70% by weight, with 1-10% by weight of an epoxy novolac resin 10-30% by weight of a polyurethane toughener which preferably has the terminal isocyanate functional group blocked, 1-8% by weight of a hardener, 0.1-% by weight of a cure accelerator, preferably a latent urea cure accelerator, provides the desired balance of mechanical strength and elastic modulus. The epoxy novolac resin is characterized by at least one of the following features: (i) having a viscosity at 25 degrees C. of less than 3000 mPa-s according to ASTM D-445, (ii) an average number of epoxide groups per molecule of more than 2 but less than 3.7, and (iii) a molecular weight of less than 750 g/mol.

The invention is thus the above epoxy resin system and the cured reaction product of the above composition. According to one preferred embodiment the system comprises a single component of the above ingredients where the polyurethane toughener is blocked so that it is stable with the epoxy and wherein the cure accelerator is latent and cure is initiated by heating, preferably to a temperature in the range of above 150° C. and preferably between 160 and 210° C.

According to a second embodiment the invention is also a system comprising a first reaction component which is an epoxy resin component including the diglycidyl ether of bisphenol A and the epoxy novolac resin and a second reaction component comprising the hardener and the cure accelerator.

DETAILED DESCRIPTION

The diglycidyl ether a bisphenol epoxy resins useful in this invention may be in liquid or solid form. A blend of such resins can be used. Preferably this component is a diglycidyl ether of bisphenol A, bisphenol F, bisphenol K, or bisphenol M. Most preferably it is a diglycidyl ether of bisphenol A.

If a blend is used it may be a mixture of a diglycidyl ether of at least one polyhydric phenol, preferably bisphenol-A or bisphenol-F, having an epoxy equivalent weight of from 170 to 299, especially from 170 to 225, and at least one second diglycidyl ether of a polyhydric phenol, again preferably bisphenol-A or bisphenol-F, this one having an epoxy equivalent weight of at least 300, preferably from 310 to 600. The proportions of the two types of resins are preferably such that the mixture of the two resins has an average epoxy equivalent weight of from 225 to 400. The mixture optionally may also contain up to 20%, preferably up to 10%, of one or more other epoxy resin.

Suitable diglycidyl ethers include diglycidyl ethers of bisphenol A resins such as are sold by Olin Corporation under the designations D.E.R. 330, D.E.R. 331, D.E.R. 332, D.E.R. 383, D.E.R. 661 and D.E.R. 662 resins. An example mixture of such resins include mixture of solid and liquid resins, such as D.E.R. 671 and D.E.R. 331 from Olin Corp. in amounts of 40 weight percent solid resin and 60 weight percent liquid resin.

The amount of diglycidyl ethers of bisphenol A resins used is at least 30 weight percent, and more preferably at least 40 weight percent but no more than 70 weight percent, preferably no more than 60 weight percent based on total weight of components of the system. Preferably, the diglycidyl ethers of bisphenol A (DGEBA) resins are a mix of solid and liquid epoxy resins with the solid DGEBA comprising at least 1 weight percent, more preferably at least 2 weight percent but preferably not more than 10 weight percent, more preferably not more than six weight percent based on total weight of components of the system and the liquid DGEBA comprising at least 30 weight percent, and more preferably at least 40 weight percent but no more than 60 weight percent based on total weight of components of the system.

The epoxy novolac resins useful in this invention are characterized by a relatively low viscosity and/or low molecular weight. Preferred epoxy novolac resins have the following structure

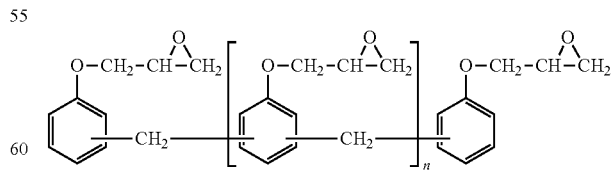

wherein n is the average number of repeat units and n is less than 1.7. Alternatively or in addition, preferred epoxy novolac resins have viscosity at 25 degrees C. of less than 3000 mPa-s, preferably less than 2500 mPa-s, and most preferably no more than 2000 mPa-s according to ASTM D-445. Alternatively or in addition preferred epoxy novolac resins have molecular weights of less than 700 g/mol, preferably less than 650 g/mol, more preferably still less than 600 grams/mol, still more preferably less than 550 g/mol and most preferably less than 500 g/mol but having a molecular weight of at least 250 grams/mol, preferably at least 300 grams/mol. Examples of suitable epoxy novolac resins include D.E.N. 354, D.E.N. 431 and D.E.N. 438 all from Olin Corporation.

The system of this invention comprises a polyurethane toughener. Preferred tougheners are chain extended by using a polyphenol, preferably ODBA (o,o'-diallylbisphenol A), using a combination of PTMEG (polytetramethylene glycol) and PBD (polybutadienediol) and are capped by using a mono-phenol. Example F is devoid of any PBD and uses a polyphenol as capping group. Preferably, particularly for a single component system activated by heat, the toughener has blocked functional groups to prevent premature reaction. The blocking is preferably done using a monophenol. The polyurethane toughener is preferably a polymerized polytetramethylene ether glycol (PTMEG) in which the tips have been modified with isocyanate and phenol compounds to allow them to react with epoxy resin when curing conditions are obtained. In the single component heat-curable adhesives, the isocyanate prepolymer needs to be protected by a capping group that dissociates from the PU-toughener when exposed to heat (curing conditions). Preferably, the toughener comprises residuals of diols have soft units (e.g. from PTMEG) and rubbery units (e.g. from polybutadienol) connected by residuals of isocyantates. The polyurethane toughener may also be chain extended using a polyphenol such a o,o'diallkylbisphonal a (OBDA). The capping groups are preferably monophenolic groups such as cardanol (from cashew nut shell oil "CNSL"), or allyl phenol. A preferred polyurethane toughener is the reaction product of PTMEG (10-95% by weight, preferably 20-90% by weight, more preferably 45-85% by weight) with a polybutadiene-diol (2-55% by weight, preferably 5-40% by weight, more preferably 10-30% by weight), a diisocyanate such as 1,6 hexamethylenediisocyanate (2-40% by weight, preferably 5-30% by weight, more preferably 10-20% by weight) and CNSL (0.1-50% by weight, preferably, 0.1-20% by weight, most preferably 0.1-15% by weight) all based on weight of the toughener. Examples of suitable blocked polyurethane tougheners are those taught in WO/2017/044402 and U.S. Pat. No. 8,404,787 example 2, each of which is incorporated herein by reference.

The amount of toughener used is preferably at least 10 weight percent, more preferably at least 15 weight percent but preferably no more than 30 weight percent, more preferably no more than 25 weight percent based on total weight of the epoxy system.

The hardeners useful in this invention may by any known as useful in the art dicyandiamide, imidazoles, amines, amides, polyhydric phenols, and polyanhydrides but are preferably amine or amide based hardeners. These hardeners are preferably latent such that they do not cause hardening under ambient conditions but rather must be heated or exposed to more than normal lighting radiation exposure to cause hardening. Suitable hardeners include dicyandiamides such as Amicure™ CG 1200 from Air Products or Dyhard 100 SF from Alzchem. The amount of hardener is preferably at least one weight percent, more preferably at least 2 weight percent, but preferably no more than 8 weight percent, more preferably no more than 6 weight percent based on total weight of the system.

The curing accelerators useful in this invention are aromatic urea based cure accelerators. These may be formed by reacting methylene diphenyl diisocyanate (MDI) with dimethylamines. Commercially available examples of such aromatic urea based cure accelerators include Omnicure™ 52M and 405M from Emerald. Phenyl-di-methyl based ureas are preferred. The amount of cure accelerator is preferably at least 0.1, more preferably at least 0.3 weight percent but preferably no more than 3, more preferably no more than 1 weight percent based on total weight of the system.

In addition to the above, the composition also includes a flexibilizer. Suitable flexibilizers include carboxy terminated acrylonitrile butadiene (CTBN) epoxy adduct or polyamine epoxy adducts. Examples of such products include Strutkol 3604 from S&S Schill & Seilacher or a combination of a D.E.R. such as D.E.R. 330 from Olin Corporation with a polyether amine such as Jeffamine D-2000 from Huntsman Corporation. The flexibilizer is preferably present in amounts of at least 5 weight percent, more preferably at least 8 weight percent but no more than 20 weight percent and more preferably no more than 15 weight percent based on total weight of the components in the system.

Fillers may also be used when desired. Suitable fillers include calcium carbonate, calcium oxide, talk wollastonite, glass beads, and the like. The amount of filler is preferably less than 30 weight percent, more preferably less than 20 weight percent. When used, the amount of filler is preferably more than 5 weight percent.

The composition may also optionally include colorants, reactive diluents, adhesion promoters and/or wetting agents. Examples of suitable colorants would be epoxy colorants from Huntsman Corporation Araldite DY series. Examples of reactive diluents include hexan, butyl diglycidyls and thereof. Adhesion promoters may be epoxy silanes such as, for example, Sylquest A 187.

The single component system may be formulated by combining all the fluids and pastes, and solids in a mixer such as a planetary mixer. For a two component system, the epoxy resin component including the diglycidyl ether of bisphenol A and the epoxy novolac resin may be combined and mixed and the second component including the hardener and cure accelerator may be combined and mixed. Then when it is desired to use the adhesive the two components are combined in situ.

The system is then heated to a temperature of at least 150° C., preferably at least 160° C., but preferably no more than 210° C. to cure.

The adhesive system may be used according to any known process. For example, the mix may be filled in cartridges. The adhesive is commonly manually applied for testing purposes out of cartridges through nozzles by using a cartridge gun. If the viscosity of the adhesive formulation is that high, that manual application cannot readily performed at room temperature the cartridge can be heated prior to 40 to 60° C. for better applicability.

The inventive systems display a good balance of high mechanical strength at elevated temperatures while having a relative low elastic modulus. Specifically, these systems show an elastic modulus of more than 600 but less than 1200 MPa when tested according to DIN EN ISO 527-1. Dumbbell specimen 5a. They also a high Lap shear strength as evidenced by a cohesive failure of 60 CF or more at 130 degrees C. and of 40 CF or more at 140 degrees C.

EXAMPLES

The invention is further illustrated by the following non-limiting examples.

TABLE 1

Raw material list for adhesive composition

| | Supplier | Chemistry |
|---|---|---|
| Solid-liquid epoxy resin mix D.E.R 671 to D.E.R. 331 = 40:60 | Olin Corporation | Solid/liquid DGEBA resin blend |
| BisA blocked PU toughener | not commercial | WO 2005/007766 A1, preparation of toughener B, which has a polyfuncional capping group and lacks polybutadiene) |
| Sec-amine blocked PU toughener | not commercial | U.S. Pat. No. 8,404,787 B2: example 2 |
| D.E.N. 438 | Olin Corporation | Epoxy-Novolac |
| Struktol 3604 | S&S Schill & Seilacher | X8 CTBN-LER adduct: 60:40 |
| Jeffamine-Epoxy adduct* | See description | Polyamine-epoxy adduct |
| Epoxy silane | Momentive | Silquest A 187 |
| Colorant | Huntsman | Color pigment paste |
| Polypox R18 | Dow | Reactive diluent: 1,6-Hexanediol-diglycidylether |
| Dyhard 100 SF | AlzChem | micronized dicyandiamide |
| Curing accelerator: tris-2,4,6-tris(dimethylaminomethyl)phenol embedded into a polyvinylphenol polymer matrix | not commercial | U.S. Pat. No. 4,659,779: Polyvinylphenol blocked Manich base curing accelerator. Accelerator II as described in the patent. |
| Omicure U52M | Emerald | Urea curing accelerator |
| Omicure U35M | Emerald | Urea curing accelerator |
| Omicure U405M | Emerald | Urea curing accelerator |
| Omya BSH | Omya | calciumcarbonate |
| Nyglos 8 | NYCO | Wollastonite |
| Huber 100C | KaMin Performance Minerals | Calcined Kaolin |
| Talc 1N | IMCD Deutschland, IMERYS | Hydrated magnesium silicate |
| Chaux Vive | Lhoist | Calciumoxide |
| K25 | 3M | Hallow glass spheres |
| Fumed silica | Evonik | Like Aerosil 202 |

*DER 330 54.8 parts by weight and Jeffamin D-2000 45.2 parts by weight are added into a lab reactor and heated up to 100° C. Mix the mixture for 60 min at 100° C. under vaccum. Then cool the mixture down to 60° C. and drum it.

TABLE 2

Raw material list for toughener A composition

| Comp. | | Supplier | Chemistry | Amount (parts by weight) |
|---|---|---|---|---|
| a | PolyTHF 2000 | BASF | Polytetrahydrofuran-diol 2000 g/mol | 57.58 |
| b | PolyBD R45 HTLO | Cray Valley | Polybutadien-diol 2800 g/mol | 14.39 |
| c | Desmodur H | Bayer | 1,6-Hexamethylenediisocyanate | 11.65 |
| d | Homid 127A | HOS | o,o'-diallylbisphenol A | 5.74 |
| e | Cardolite NC 700 | Cardolite | Cardanol | 10.58 |
| f | Dabco T12 N | Air Products | Dibutyltindialuerate | 0.06 |

General Toughener A (Preferred Toughener) Synthesis:

1. First reaction step: x wt % of component [a] and [b] are added into a lab reactor and heated up to 120° C. Mix the mixture for 30 min at 120° C. under vacuum. Then cool the mixture down to 60° C. If the temp reach 60° C. add x wt % of component [c] and let it mix for 2 min. Then add x wt % of component [d] and the mixture is allowed to react at 85° C. (bath temperature) for 45 min under nitrogen.

2. Second reaction step: x wt % of component [e] is added and the mixture is stirred for 60 min under nitrogen at 95° C. [bath temperature].

3. Third reaction step: x wt % of component [f] is added and the mixture is stirred for 120 min under nitrogen. Finally the mixture will stirred for 20 min under vacuum.

Table 3 shows the various formulations made. These formulations were made by following the general procedure: Combine all fluids, pastes and the colorant in the can and mix for five minutes at 50° C., then mix under vacuum for an additional 30 minutes. Scrape-down, add fumed silica, set temperature to 35° C., mix for three minutes and then mix under vacuum for an additional 20 minutes. Add all other pigments, mix under vacuum for three minutes and then after scraping down mix under vacuum for an additional fifteen minutes.

TABLE 3

| Raw materials | A | B | C | D | E | F | G | H | I | J | K | L | M | N | O |
|---|---|---|---|---|---|---|---|---|---|---|---|---|---|---|---|
| Type of example-reference or inventive | ref | inv | inv | inv | inv | ref | inv | ref | inv | ref | ref | inv | ref | ref | inv |
| *Solid-liquid epoxy resin mix | 29.92 | 26.82 | 24.77 | 22.72 | 19.67 | 24.77 | 24.77 | 28.07 | 24.82 | 24.77 | 24.77 | 24.77 | 24.77 | 24.82 | 24.82 |
| D.E.N. 438 | 0 | 3 | 5 | 7 | 10 | 5 | 5 | 5 | 5 | 5 | 5 | 5 | 5 | 0 | 0 |
| D.E.N. 439 | 0 | 0 | 0 | 0 | 0 | 0 | 0 | 0 | 0 | 0 | 0 | 0 | 0 | 5 | 0 |
| D.E.N. 431 | 0 | 0 | 0 | 0 | 0 | 0 | 0 | 0 | 0 | 0 | 0 | 0 | 0 | 0 | 5 |
| Struktol 3604 | 10 | 10 | 10 | 10 | 10 | 10 | 10 | 0 | 0 | 10 | 10 | 10 | 10 | 10 | 10 |
| INT Jeff-EP (table 4) | 0 | 0 | 0 | 0 | 0 | 0 | 0 | 0 | 10 | 0 | 0 | 0 | 0 | 0 | 0 |
| Toughener A | 23 | 23 | 23 | 23 | 23 | 0 | 0 | 30 | 23 | 23 | 23 | 23 | 0 | 23 | 23 |
| Bis A blocked PU toughener (RAM F) | 0 | 0 | 0 | 0 | 0 | 23 | 0 | 0 | 0 | 0 | 0 | 0 | 0 | 0 | 0 |
| Sec-amine blocked PU toughener (RAM DIPA) | 0 | 0 | 0 | 0 | 0 | 0 | 23 | 0 | 0 | 0 | 0 | 0 | 0 | 0 | 0 |
| Sika D1 (US 2010/0273005A1) (not chain extended, uses isophorone diisocyanate) | 0 | 0 | 0 | 0 | 0 | 0 | 0 | 0 | 0 | 0 | 0 | 0 | 23 | 0 | 0 |
| Epoxy silan | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Polypox R18 | 2 | 2 | 2 | 2 | 2 | 2 | 2 | 2 | 2 | 2 | 2 | 2 | 2 | 2 | 2 |
| colorant | 0.53 | 0.53 | 0.53 | 0.53 | 0.53 | 0.53 | 0.53 | 0.53 | 0.53 | 0.53 | 0.53 | 0.53 | 0.53 | 0.53 | 0.53 |
| DYHARD 100SF | 3.15 | 3.25 | 3.3 | 3.35 | 3.4 | 3.3 | 3.3 | 3.0 | 3.25 | 3.3 | 3.3 | 3.3 | 3.3 | 3.25 | 3.25 |
| Curing accelerator: tris-2,4,6-tris(dimethylaminomethyl)phenol embedded into a polyvinyl-phenol polymer matrix | 0 | 0 | 0 | 0 | 0 | 0 | 0 | 0 | 0 | 0.7 | 0 | 0 | 0 | 0 | 0 |
| Omicure U-52M (aromatic urea) | 0.7 | 0.7 | 0.7 | 0.7 | 0.7 | 0.7 | 0.7 | 0.7 | 0.7 | 0 | 0 | 0 | 0.7 | 0.7 | 0.7 |
| Omicure U-35M (aliphatic urea) | 0 | 0 | 0 | 0 | 0 | 0 | 0 | 0 | 0 | 0 | 0.7 | 0 | 0 | 0 | 0 |
| Omicure U-405M (aromatic urea) | 0 | 0 | 0 | 0 | 0 | 0 | 0 | 0 | 0 | 0 | 0 | 0.7 | 0 | 0 | 0 |
| Huber 100C | 11 | 11 | 11 | 11 | 11 | 11 | 11 | 11 | 11 | 11 | 11 | 11 | 11 | 11 | 11 |
| Nyglos 8 | 4 | 4 | 4 | 4 | 4 | 4 | 4 | 4 | 4 | 4 | 4 | 4 | 4 | 4 | 4 |
| Talk 1N | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Chaux Vive | 6 | 6 | 6 | 6 | 6 | 6 | 6 | 6 | 6 | 6 | 6 | 6 | 6 | 6 | 6 |
| K25 | 1.7 | 1.7 | 1.7 | 1.7 | 1.7 | 1.7 | 1.7 | 1.7 | 1.7 | 1.7 | 1.7 | 1.7 | 1.7 | 1.7 | 1.7 |
| Fumed silica | 7 | 7 | 7 | 7 | 7 | 7 | 7 | 7 | 7 | 7 | 7 | 7 | 7 | 7 | 7 |

The formulations were tested according to the following procedures:

Rheology
  Rotatory viscosity/yield stress: Bohlin CS-50 Rheometer, C/P 20, up/down 0.1-20 s/l; evaluation according to Casson model
DSC: Mettler Toledo 25° C.-250° C., 10° C./min ramp up; TG measured with the second run
Mechanical Testing
Used steel: hot dipped zinc coated steel: 420LAD+Z100 MB, thickness 1.2 mm and electrolytically zinc coated steel HC 340LAD+ZE 50-50 thickness 1.0 mm as supplied by Voest Alpine.

Lap shear strength following DIN EN 1465: 10×25 mm bonded area, 0.2 mm adhesive layer thickness. LS substrate=H420 Z100 LAD 1.2 mm//H340 ZE 50/50 1.0 mm combination supplied by VoestAlpine. Test speed 10 mm/min.
Lap shear strength was tested at 23° C., 130° C. and 140° C.
Impact peel strength following ISO 11343: 20×30 mm bonded area, 0.3 mm adhesive layer thickness. IP substrate=H420 Z100 LAD 1.0 mm supplied by VoestAlpine. Test speed 2 m/s.
Modulus was tested following DIN EN ISO 527-1. Dumbell specimen 5a.

Table 4 shows the test results:

| Formulation | A | B | C | D | E | F | G | H |
|---|---|---|---|---|---|---|---|---|
| Type of Examples (reference or inventive) | ref | inv | inv | inv | inv | ref | inv | ref |
| Lab number | 1822.516 | 1822.515 | 1822.517 | 1822.518 | 1822.519 | 1822.520 | 1822.521 | 1822.525 |
| DSC, Tg [° C.] | 81 | 78 | 79 | 90 | 82 | 94 | 91 | 79 |
| Initial rheological data | | | | | | | | |
| Viscosity, Casson, 45° C. [Pas] | 138 | 180 | 160 | 167 | 129 | 225 | 58 | 170 |
| Yield stress, Casson, 45° C. [Pa] | 877 | 768 | 759 | 694 | 800 | 953 | 761 | 790 |
| Bulk adhesive data | | | | | | | | |
| Elastic Modulus [MPa] | 1016 | 1058 | 1107 | 1123 | 1026 | 1650 | 1065 | 943 |
| Elongation [%] | 11.5 | 11.1 | 10 | 9.3 | 8.1 | 7.3 | 11.5 | 11.1 |
| Tensile Strength [MPa] | 20 | 21 | 21 | 22 | 20 | 27 | 21 | 18 |
| Lap shear strength [MPa] | | | | | | | | |
| steel HC 420 LAD + Z100MB/HC 340LAD + ZE 50-50 | 21.1 | 21.3 | 21.5 | 21.4 | 20.8 | 25.3 | 20.4 | 19 |
| At 130° C. | 4.5 | 5.6 | 6.1 | 6.4 | 7.4 | 8.0 | 7.0 | 5.3 |

-continued

| | | | | | | | | |
|---|---|---|---|---|---|---|---|---|
| Failure mode at 130° C. | 50CF | 90CF | 80CF | 90CF | 80CF | 20CF | 100CF | 90CF |
| At 140° C. | 3.0 | 4.7 | 4.0 | 5.4 | 5.9 | 5.3 | 6 | 4.4 |
| Failure mode at 140° C. | 10CF | 50CF | 40-50CF | 50CF | 60CF | 10CF | 100CF | 10CF |
| Impact peel strength [N/mm] | | | | | | | | |
| HC 420LAD + Z 100MB; 23° C. | 30 | 29 | 28 | 26 | 23 | 33 | 32 | 29 |

| Formulation | I | J | K | L | M | N | O |
|---|---|---|---|---|---|---|---|
| Type of Examples (reference or inventive) | inv | ref | ref | inv | ref | ref | inv |
| Lab number | 1822.526 | 1822.527 | 1822.538 | 1822.539 | 1822.540 | 1822.549 | 1822.555 |
| DSC, Tg [° C.] | 80 | 79 | 89 | 87 | 89 | 86 | 79 |
| Initial rheological data | | | | | | | |
| Viscosity, Casson, 45° C. [Pas] | 136 | 194 | 138 | 142 | 48 | 159 | 110 |
| Yield stress, Casson, 45° C. [Pa] | 745 | 500 | 736 | 770 | 592 | 839 | 718 |
| Bulk adhesive data | | | | | | | |
| Elastic Modulus [MPa] | 999 | 1431 | 1149 | 1057 | 1217 | 1210 | 1106 |
| Elongation [%] | 10.9 | 7.2 | 8.7 | 9.5 | 7.3 | 10.3 | 10.4 |
| Tensile Strength [MPa] | 22 | 24 | 21 | 20 | 20 | 21 | 20 |
| Lap shear strength [MPa] | | | | | | | |
| steel HC 420 LAD + Z100MB/ HC 340LAD + ZE 50-50 | 21.5 | 22 | 22.1 | 21.5 | 21.2 | 21.4 | 22.3 |
| At 130° C. | 6.8 | 6.8 | 5.9 | 6.2 | 5.4 | 6.4 | 8.1 |
| Failure mode at 130° C. | 85CF | 90CF | 70CF | 80CF | 40CF | 20CF | 70CF |
| At 140° C. | 4.3 | 4.0 | 4.7 | 4.3 | 4.5 | 4.6 | 5.7 |
| Failure mode at 140° C. | 70CF | 10CF | 10CF | 40-50CF | 30-40CF | 20CF | 70CF |
| Impact peel strength [N/mm] | | | | | | | |
| HC 420LAD + Z 100MB; 23° C. | 28 | 28 | 27 | 27 | 25 | 27 | 30 |

What is claimed is:

1. An adhesive epoxy resin system comprising:
   a. 30-70% by weight of one or more diglycidyl ether bisphenol A resins, comprising a mixture of 40% by weight solid resin and 60% by weight liquid resin based on the weight of the mixture of solid and liquid resins,
   b. 1-10% by weight of an epoxy novolac resin wherein the epoxy novolac resin is characterized by at least one of the following features: (i) having a viscosity at 25 degrees C. of less than 3000 mPa-s according to ASTM D-445, (ii) an average number of epoxide groups per molecule of more than 2 but less than 3.7, and (iii) a molecular weight of less than 750 g/mol,
   c. 10-30% by weight of a polyurethane toughener,
   d. 5-20% by weight of a flexibilizer, wherein the flexibilizer is a carboxy terminated acrylonitrile butadiene epoxy adduct or a polyamine epoxy adduct,
   e. 1-8% by weight of a hardener, and
   f. at least 0.1% by weight of an aromatic urea based cure accelerator,
   wherein the weight percents are based on total weight of the system;
   wherein the polyurethane toughener is the reaction product of 10-95% by weight polytetramethylene ether glycol with 2-55% by weight of a polybutadiene-diol, 2-40% by weight of a diisocyanate and 0.1-50% by weight of cashew nut shell oil, all based on the weight of the toughener, and
   wherein the toughener is chain extended by reaction with a polyphenol chain extender, wherein said chain extender is o,o'-diallylbisphenol A; and
   wherein the adhesive epoxy resin system is a two-component system wherein a first component comprises the one or more diglycidyl ether bisphenol A resins and the epoxy novolac resin and a second component comprises the polyurethane toughener, the hardener and the cure accelerator.

2. The adhesive epoxy resin system of claim 1 further comprising a filler in an amount of 5 to 30% by weight.

3. The adhesive epoxy resin system of claim 1 wherein the epoxy novolac resin has the formula

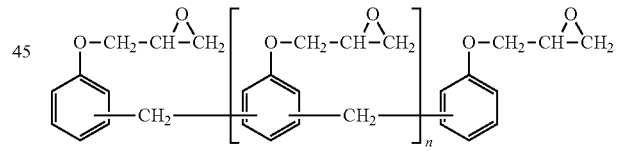

wherein n is the average number of repeat units and n is less than 1.7.

4. The adhesive epoxy resin system of claim 1 wherein the hardener is a dicyandiamide.

5. The adhesive epoxy resin system of claim 1 wherein the epoxy novolac resin has a viscosity at 25 degrees C. of less than 3000 mPa-s according to ASTM D-445.

6. The adhesive epoxy resin system of claim 1 wherein the epoxy novolac resin has an average number of epoxide groups per molecule of more than 2 but less than 3.7.

7. The adhesive epoxy resin system of claim 1 wherein the epoxy novolac resin has a molecular weight of less than 750 g/mol.

* * * * *